Patented Jan. 3, 1950

2,493,071

UNITED STATES PATENT OFFICE 2,493,071

SULFUR-CONTAINING CARBOXYLIC ACID ESTERS

John David Kendall and Harry Derek Edwards, Ilford, England, assignors to Ilford Limited, Ilford, England, a British company No Drawing. Application August 2, 1946, Serial No. 687,939. In Great Britain August 17, 1945

8 Claims. (Cl. 260—327)

This invention relates to the production of new organic compounds which are valuable intermediates for the production of organic compounds of commercial utility.

Various attempts have been made in the past to effect reaction between carbon disulphide and compounds containing reactive methylene groups, and some measure of success in certain instances has been obtained. Examples are the processes described by Apitzsch in Berichte, volume 38, page 2888, and volume 41, page 4028, by Wenzel in Berichte, volume 33, page 2041, and volume 34, pages 1043–1045, and in British Patent No. 549,201. The processes described in these publications, however, are of limited application and the products obtained by these prior methods are entirely different from those with which the present invention is concerned.

According to the present invention, new organic compounds are prepared by reacting carbon disulphide with the dry alkali-metal derivative of a compound of the general formula:

$$Q-CH_2-COOR_1$$

where Q represents any of the groupings $-COOR_2$, $-COR_3$ or $-CN$ (i. e. an acid ester, acyl or nitrile grouping) and $R^1$, $R^2$ and $R^3$ are each a hydrocarbon group, preferably an alkyl group, and reacting the product with an alkyl salt or alkyl ester.

It is important to the producton of a high yield of the products that the reaction with carbon disulphide should be effected in a medium substantially free of water or any other hydroxylic solvent. However, the presence in the reaction mixture of a small quantity of ethyl alcohol, while usually reducing the yield, in some cases tends to increase the rate of the reaction.

The series of reactions is believed to be as follows. (In these formulae $R_4$ represents an alkyl or substituted alkyl group.)

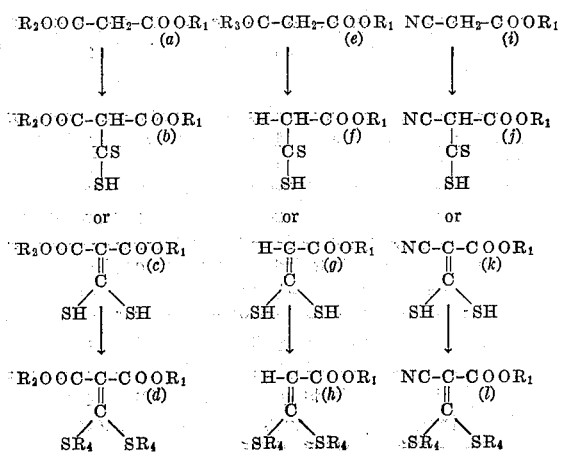

The various compounds are lettered (a) to (l) for convenience in subsequent reference herein.

In connection with the above reactions it should be pointed out that since the reactions are effected using the alkali metal salt of the original compounds (a), (e) and (i) it is probable that in all the formulae where a sulphur atom is shown as linked to a simple hydrogen atom, that hydrogen atom will be replaced by an atom of the alkali metal. The intermediate stages (b) or (c), (f) or (g) and (j) or (k) are included for the sake of clarity, but it will be understood that there is no necessity to isolate such intermediates.

If there is used an alkylating agent which permits it, the groups $R_4$ in compounds (d), (h) and (l) may link up to form a ring compound.

For example, if the alkylating agent is chloracetic ethyl ester the reaction proceeds as follows:

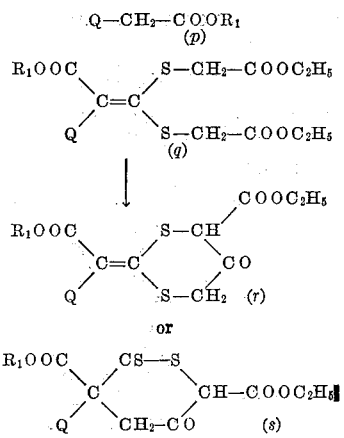

In the above formulae the intermediate steps in the formation of the dimercaptal have been omitted. The precise nature of the product (r) or (s) is uncertain, but it will be appreciated that these compounds are structurally isomeric.

Further, the $R_4$ groups may be connected to form a single di-valent grouping linking the two sulphur atoms: such products being obtained by the use as alkylating agents of di-salts or di-esters, e. g. alkylene dihalides such as ethylene dibromide or trimethylene dibromide.

The products of this invention are valuable intermediates in the production of other organic compounds. For example, by hydrolysis of a compound of type (d) where the $R_4$ groups are methyl groups there is obtained the compound:

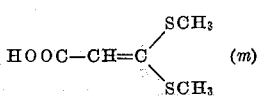

and this on dry distillation breaks down to form ketene dimercaptal:

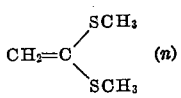

Similarly compounds of type ($h$) may be converted to compounds of type ($m$) and thence to compounds of type ($n$).

In the case of compounds of type ($l$) where the $R_4$ groups constitute a single divalent grouping the effect of hydrolysis is to cause the compound to break down as follows:

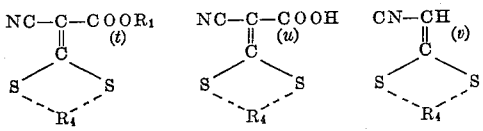

The reaction with carbon disulphide can conveniently be effected with the compounds in suspension in ether though other inert solvents can be used. As alkali-metal, metallic sodium is preferred as being the most convenient to use. The alkylation may be effected, for example, with methyl, ethyl or higher alkyl halides and the iodides are particularly suitable. Other alkylating agents which may be used are dialkyl sulphates, e. g. dimethyl sulphate or diethyl sulphate, alkyl p-toluene sulphonates, e. g. methyl or ethyl p-toluene sulphonate, alkylene dihalides such as ethylene dibromide and trimethylene dibromide. As already indicated the alkyl group of the alkylating agent may be substituted so that other alkylating agents which may be used are chloracetic esters and benzyl halides or sulphates.

The following specific examples serve to illustrate the invention:

EXAMPLE 1

*Preparation of a compound of the Formula ($d$) where $R_1$ and $R_2$ are ethyl groups and $R_4$ is a methyl group*

One molecular equivalent of powdered sodium was covered with anhydrous ethyl ether. Half a molecular equivalent of diethyl malonate was added slowly, the mixture stirred for ten hours and then allowed to stand for 12 hours. Half a molecular equivalent of carbon disulphide was added at room temperature and the mixture stirred for 15 hours. It was then allowed to stand for 5 days, refluxed for 5 hours, and allowed to cool. One molecular equivalent of methyl iodide was then added slowly with stirring and gentle warming. The reaction mixture was then refluxed for 3 hours, allowed to stand for 24 hours and filtered. The filtrate was concentrated by evaporation of ether and the residue distilled twice at 15 mm. pressure. The product had a boiling point at 196° C./15 mm., and was a light yellow oil.

EXAMPLE 2

*Alternative preparation of the product of Example 1*

One molecular equivalent of powdered sodium was covered with anhydrous ethyl ether and one molecular equivalent of ethyl alcohol was added. The mixture was stirred for 8 hours, allowed to stand for 12 hours, half a molecular equivalent of diethyl malonate added and then stirred for 4 hours. A thick gelatinous precipitate was formed. Half a molecular equivalent of carbon disulphide was then added and the mixture stirred for one hour and allowed to stand for 12 hours. One molecular equivalent of methyl iodide was then added with stirring at room temperature and the mixture allowed to stand for 36 hours. The resulting solution was filtered, the filtrate concentrated and then distilled at 20 mm. pressure. The product had a boiling point of 204° C. at 20 mm. pressure.

The compound of the Formula ($m$) may be prepared from the foregoing product by the following method.

One molecular equivalent of the compound produced as above was added to 2½ molecular equivalents of potassium hydroxide (15% alcoholic solution) and allowed to stand for 3 hours. The precipitated salt was filtered off, dissolved in water and acidified with 10% hydrochloric acid. A yellow oil was precipitated, carbon dioxide was evolved and the yellow oil hardened to a white solid. This was recrystallised from ethyl alcohol solution yielding the required product as colourless crystals, M. Pt. 197° C. By dry distillation, at 10 mm. pressure, these crystals yielded ketene dimercaptal boiling at 80° C. at 10 mm. pressure.

EXAMPLE 3

*Preparation of the compound of the Formula ($h$) where $R_1$ is an ethyl group and $R_4$ is a methyl group*

One molecular equivalent of powdered sodium was covered with anhydrous ethyl ether, one molecular equivalent of ethyl acetoacetate was added slowly, and the mixture stirred for 5 hours and left standing overnight. One molecular equivalent of carbon disulphide was then added, and the mixture stirred. One molecular equivalent of ethyl alcohol was then added and the mixture refluxed for 5 hours and allowed to stand for 6 days. During this period the sodium ethyl acetoacetate appeared to pass into solution. A yellow precipitate was formed and this was filtered off and suspended in fresh anhydrous ether. A slight excess over half a molecular equivalent of methyl iodide was added, the mixture refluxed for 4 hours, allowed to stand for 12 hours and then filtered. The filtrate was concentrated, and the residue distilled at 15 mm. pressure. It boiled at 164° C. The distilled product was then recrystallised from petroleum ether (60°–80° boiling range) solution as colourless crystals, M. Pt. 56° C. An increased yield may be obtained by using a larger quantity of methyl iodide, for example up to two molecular equivalents.

EXAMPLE 4

*Preparation of the compound of the Formula ($l$) where $R_1$ is an ethyl group and $R_4$ is a methyl group*

One molecular equivalent of powdered sodium was covered with anhydrous ether, one molecular equivalent of ethyl cyanacetate was added and the mixture refluxed for 3 days. One molecular equivalent of carbon disulphide was then stirred in and the reaction mixture allowed to stand for 10 days. Methyl iodide (two molecular equivalents) was then added and the mixture refluxed for 3 days and then allowed to stand for 10 days. The solution was then filtered and the filtrate concentrated and distilled at 30 mm. pressure. The product distilled at 215° C. On recrystallisation from ethyl alcohol it was obtained as colourless crystals, M. Pt. 57° C.

EXAMPLE 5

*Preparation of the compound of the Formula (r) or (s)*

The addition of carbon disulphide to sodio ethyl malonate was effected as in Example 2 using the same proportions of reagents. Then, instead of using methyl iodide, one molecular equivalent of ethyl chloracetate was added and the mixture stirred for 2 hours and then refluxed for 1 hour. A precipitate formed on cooling and this was filtered off (A). The filtrate was concentrated and distilled at 15 mm. pressure. A fraction boiling at 158–160° C. proved to be ethane tricarboxylic ester, and another fraction boiling at 220–260° set solid. This latter product (B) was washed with ethyl alcohol. It had a melting point of 87° C.

The precipitate A was washed with water and ethyl alcohol and then ground with dilute hydrochloric acid, filtered and the residue recrystallised from ethyl alcohol. This product also melted at 87° C. and was identical with the product B but in much greater yield, and was the required compound.

EXAMPLE 6

*Preparation of the compound of the Formula (d) where $R_1$ and $R_2$ are ethyl groups and the $R_4$ groups are a single dimethylene group, i. e.,*

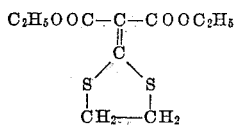

Two molecular equivalents of powdered sodium were covered with anhydrous diethyl ether. One molecular equivalent of diethyl malonate was added slowly, with stirring, and the mixture allowed to stand for 48 hours. One molecular equivalent of carbon disulphide was then added at room temperature, with stirring, and the mixture left to stand for 72 hours. One molecular equivalent of ethylene dibromide was then added and the mixture allowed to stand for a week. It was then gently refluxed for 36 hours and filtered. The filtrate was concentrated by evaporation of ether and distilled at 2.5 mm. pressure. The desired compound distilled with a boiling point of 202° C. at 2.5 mm. pressure. It was a bright yellow oil which solidified on standing.

The foregoing product, on hydrolysis by treatment with 15% alcoholic potassium hydroxide solution in the cold for 48 hours yielded a precipitate which, on washing with alcohol, dissolution in water and acidification with 10% hydrochloric acid, yielded a precipitate of the compound having the formula:

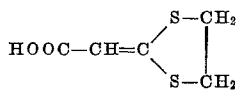

which had a melting point of 150° C.

EXAMPLE 7

*Preparation of the compound of the Formula (l) where $R_1$ and $R_4$ are ethyl groups*

Two molecular equivalents of powdered sodium were covered with anhydrous ether and one molecular equivalent of ethyl cyanacetate was added slowly with stirring. The mixture was boiled gently under reflux for 4 hours and then allowed to stand for 48 hours. One molecular equivalent of carbon disulphide was then added and the mixture allowed to stand for 120 hours with occasional vigorous stirring. Two molecular equivalents of ethyl iodide were then slowly added to the warmed solution and the mixture was kept warm for 24 hours and then allowed to stand for 120 hours. The resulting solution was filtered. The filtrate was set aside and the residue was covered with ether and treated with one molecular equivalent of ethyl alcohol and two molecular equivalents of ethyl iodide. A vigorous reaction took place. The mixture was allowed to stand for 24 hours, and then poured on to cracked ice in an atmosphere of carbon dioxide. The ether solution was washed with water and dried over anhydrous sodium sulphate. It was then filtered, concentrated and distilled at 1.5 mm. pressure yielding the desired product as a pale yellow oil, B. Pt. 180° C. at 1.5 mm. pressure. The original filtrate set aside earlier, on distillation yielded a small amount of the same product.

EXAMPLE 8

*Preparation of the compound of Formula (b) where $R_1$ is an ethyl group and $R_4$ is a benzyl group*

The reaction procedure of Example 7 was followed except that benzyl chloride was used instead of ethyl iodide. The originally obtained etherial solution was filtered and the residue washed to yield the product as large colourless crystals, M. Pt. 84° C. on recrystallisation from ethyl alcohol solution. The filtrate, on concentration, hardened to yield an oil which, on treatment with ethyl alcohol, gave a further yield of the product.

EXAMPLE 9

*Preparation of the compound of Formula (t) where $R_1$ is ethyl and $R_4$ is trimethylene*

The reaction procedure of Example 7 was followed except that the equivalent amount of trimethylene dibromide was used instead of ethyl iodide. The etherial solution was treated as in Example 8 giving a substantial yield of the product from the residue after filtration and a smaller yield from the filtrate. The product had a melting point of 92° C.

This product, on hydrolysis by refluxing for 2 minutes with 5 N alcoholic potassium hydroxide, yielded a solid product which on purification had a melting point of 215° C. with decomposition. It had the Formula (u) where $R_4$ is a trimethylene group. On distillation of this product in vacuo an oil was obtained which solidified in long needle clusters, M. Pt. 32° C. This had the Formula (v) where $R_4$ is trimethylene.

What we claim is:

1. Process for the production of organic compounds which comprises reacting carbon disulfide with a dry alkali-metal derivative of a reactive methylene compound of the general formula:

$$Q-CH_2-COOR_1$$

where Q is selected from the group consisting of $-COOR_2$, $-COR_3$ and $-CN$, and $R_1$, $R_2$, and $R_3$ are hydrocarbon groups, under substantially anhydrous conditions in an inert medium and reacting the resulting reaction product with an alkylating agent taken from the group consisting of alkyl halides, dialkyl sulfates, alkyl-p-toluene sulfonates, alkylene dihalides, benzyl halides, benzyl sulfates and chloracetic acid alkyl esters.

2. Process for the production of organic compounds which comprises reacting carbon disulfide with a dry sodium derivative of a reactive methylene compound of the general formula:

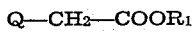

where Q is selected from the group consisting of —COOR$_2$, —COR$_3$ and —CN, and R$_1$, R$_2$ and R$_3$ are hydrocarbon groups, under substantially anhydrous conditions in an inert medium and reacting the resulting reaction product with an alkylating agent taken from the group consisting of alkyl halides, dialkyl sulfates, alkyl-p-toluene sulfonates, alkylene dihalides, benzyl halides, benzyl sulfates and chloracetic acid alkyl esters.

3. Process for the production of organic compounds which comprises reacting carbon disulfide with a dry sodium derivative of a reactive methylene compound of the general formula:

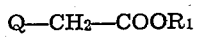

where Q is selected from the group consisting of —COOR$_2$, —COR$_3$ and —CN and R$_1$, R$_2$ and R$_3$ are hydrocarbon groups, under anhydrous conditions in a diethyl ether medium and reacting the resulting reaction product with an alkylating agent taken from the group consisting of alkyl halides, dialkyl sulfates, alkyl-p-toluene sulfonates, alkylene dihalides, benzyl halides, benzyl sulfates and chloracetic acid alkyl esters.

4. Process for the production of organic compounds which comprises reacting carbon disulfide with a dry sodium derivative of a reactive methylene compound of the general formula:

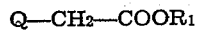

where Q is selected from the group consisting of —COOR$_2$, —COR$_3$ and —CN and R$_1$, R$_2$ and R$_3$ are hydrocarbon groups, under anhydrous conditions in a diethyl ether medium and reacting the resulting reaction product with an alkyl halide.

5. Process for the production of organic compounds which comprises reacting carbon disulfide with a dry sodium derivative of a reactive methylene compound of the general formula:

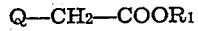

where Q is selected from the group consisting of —COOR$_2$, —COR$_3$ and —CN and R$_1$, R$_2$ and R$_3$ are hydrocarbon groups, under anhydrous conditions in a diethyl ether medium and reacting the resulting reaction product with an alkylene dihalide.

6. The process which comprises reacting carbon bisulfide with the dry sodium derivative of the formula:

in an anhydrous diethyl ether medium and reacting the resulting reaction product with methyl iodide and recovering the compound of the formula:

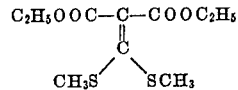

7. The process which comprises reacting carbon bisulfide with the dry sodium derivative of the formula:

in an anhydrous diethyl ether medium and reacting the resulting reaction product with methyl iodide and recovering the compound of the formula:

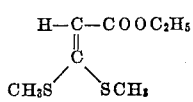

8. The process which comprises reacting carbon bisulfide with the dry sodium derivative of the formula:

in an anhydrous diethyl ether medium and reacting the resulting reaction product with ethylene dibromide and recovering the compound of the formula:

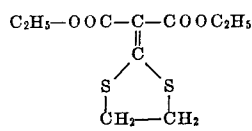

JOHN DAVID KENDALL.
HARRY DEREK EDWARDS.

REFERENCES CITED

The following references are of record in the file of this patent:

UNITED STATES PATENTS

| Number | Name | Date |
|---|---|---|
| 2,193,415 | Coltof | Mar. 12, 1940 |

FOREIGN PATENTS

| Number | Country | Date |
|---|---|---|
| 549,202 | Great Britain | Nov. 11, 1942 |

OTHER REFERENCES

Chemical Abstracts 27: 2149-8 (1933).